United States Patent [19]

Hubbard

[11] 4,013,996
[45] Mar. 22, 1977

[54] BACKUP WARNING DEVICE

[76] Inventor: Wynant D. Hubbard, 3004 Willow Lane, Thousand Oaks, Calif. 91360

[22] Filed: Sept. 25, 1975

[21] Appl. No.: 616,829

[52] U.S. Cl. .................................. 340/70; 340/74; 340/95

[51] Int. Cl.² ......................................... B60Q 1/22

[58] Field of Search ............... 340/70, 55, 81, 74, 340/95

[56] References Cited
UNITED STATES PATENTS

| | | | |
|---|---|---|---|
| 3,037,188 | 5/1962 | Weigl | 340/70 |
| 3,252,136 | 5/1966 | Bartens | 340/70 |
| 3,483,509 | 12/1969 | DeCastelet | 340/81 R |
| 3,508,237 | 4/1970 | Kimmelman | 340/251 |
| 3,883,845 | 5/1975 | DeVita | 340/67 |

Primary Examiner—John W. Caldwell
Assistant Examiner—Donnie L. Crosland
Attorney, Agent, or Firm—Dennis L. Mangrum

[57] ABSTRACT

The present invention is a safety device which will cause the signal indicator lights of a vehicle and any vehicle being towed thereby to simultaneously flash on and off when the vehicle is being backed; thereby providing warning to pedestrians and other members of the driving public in the vicinity.

2 Claims, 1 Drawing Figure

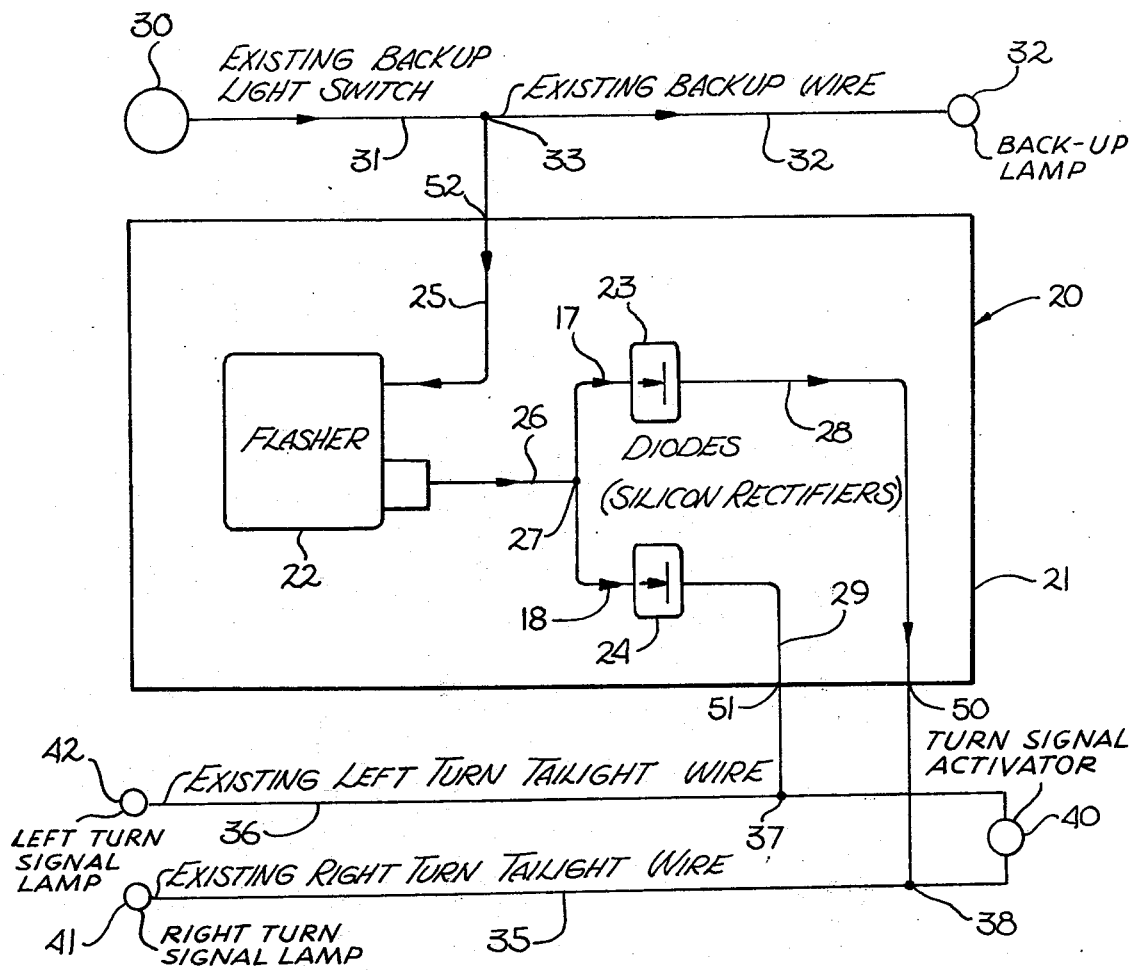

BACKUP WARNING DEVICE

BACKGROUND OF THE INVENTION

1. Field of the Invention

This invention relates generally to devices for use in travel vehicles and specifically to safety devices that provide warning the vehicle is backing.

2. Prior Art

Backing vehicles are hazardous to drivers, to pedestrians and to drivers of other vehicles in the vicinity. A particular problem occurs in parking where drivers are required to back from the parked position into the flow of traffic to exit a parking place. It is difficult for drivers of approaching vehicles to recognize that a vehicle is backing until it is in the traffic flow. Many accidents occur in parking lots when cars exit their parking places because no warning is provided to oncoming vehicles of the backing vehicle.

The automobile industry has provided backup lights on many new vehicles for a special purpose. The backup lights are not colored and produce light to illuminate the path of the vehicle as it backs. This illumination is for the benefit of the driver of the vehicle backing and is not to warn other drivers. The backup lights do provide some warning to oncoming drivers, particularly during nighttime. However, the backup lights cannot be seen in daylight and provide little or no warning of the backing vehicle.

Some prior art devices have been employed to provide warning for backing vehicles. For example, some manufacturers of heavy semi-trailers provide a ringing bell when the vehicle is backing. However, when the semi-tractor is backing the bell is more often than not muffled and other approaching drivers and pedestrians may not be aware that the bell is in fact a warning of a backing semi-trailer. Other manufacturers of heavy equipment, like caterpillars and tractors, also employ a ringing bell to warn of the backing vehicle.

There are no known effective devices for warning either pedestrians or other mmbers of the driving public that a vehicle is backing or is commencing to back. In the instance when backup lights are employed, some warning is provided. However, if the vehicle is towing a horsetrailer, boat, tent trailer, trailer or other recreational vehicle, that vehicle blocks the backup lights of the towing vehicle. In addition, most trailers, boats, etc., do not have backup lights itself but only signal and stop lights. Thus, there are no warning devices for either pedestrians or drivers that a vehicle is backing. This presents considerable safety problems to pedestrians and other vehicles when exposed to backing vehicles towing boats, trailers or other recreational vehicles, since no warning is provided at all.

The present invention provides a device for effectively warning pedestrians and other members of the driving public that a vehicle is about to back, or is backing. The device of the present invention protects the driver of a vehicle by providing safety warnings that the vehicle is backing. The present invention is especially useful on vehicles which tow boats, trailers or recreational vehicles.

SUMMARY OF THE INVENTION

A device for providing warning to pedestrians and other members of the driving public that a vehicle is about to back or is backing is disclosed. The device is coupled into the existing electrical system of a vehicle such that when the vehicle is placed in reverse, a steady electrical impulse is transmitted to the device which then transmits a regular pulsed current simultaneously to both signal indicators causing them to flash on and off during backing. The device is comprised of an electrical circuit having an impulse generator coupled to the existing backup lights. The impulse generator is also coupled to each signal indicator light of the vehicle. A one-directional diode is disposed in the circuit between the impulser and each signal light preventing energy from an activated turn signal from passing to the other turn signal or backup lights.

It is an object of the invention to provide a device which will warn pedestrians and other members of the driving public the vehicle is backing or about to back.

It is an object of the invention to provide a safety device for use on trucks, cars, or recreational vehicles which will cause the signal indicator lights to flash on and off when the vehicle is backing.

It is still another object of the invention to provide a device which will cause the signal indicator lights of the towing and towed vehicle to flash on and off while backing.

BRIEF DESCRIPTION OF THE DRAWINGS

FIG. 1 is an illustration of the present invention partially drawn in schematic form to illustrate the appropriate electrical connections of the present invention to the existing electrical system of a vehicle.

DETAILED DESCRIPTION OF THE PREFERRED EMBODIMENT

The present invention is a device which can easily be installed in any automobile, truck or recreational vehicle. The device is illustrated in a partial schematic illustration in FIG. 1. Referring to that figure, the components of the present invention and its accompanying circuitry are illustrated. In the preferred form of the present invention the housing 20 is used to contain the invented device. The housing may be formed from aluminum, metal, plastic or other suitable material which is resistant to the elements and is of substantial strength to protect it from crushing or being broken in normal use. In the preferred form an aluminum housing is employed.

The components of the present invention are: a flasher 22 and two one-directional diodes 23 and 24. The flasher 22 is an electrical device which is well known in the prior art and manufactured by all automobile manufacturers for use in turn signal operation. One such device is manufactured by Ideal Corporation and is described as part number HD552 flasher.

Lead wire 25 is coupled to and extends from the flasher through aperture 52 in housing 20 and is connected to the existing electrical system of the automobile as described hereinafter. Lead wire 26 is coupled to and extends from the flasher. Wire 26 is coupled to two other additional lead wires 17 and 18 such that leads 17 and 18 are in series. The diodes 23 and 24 are connected to leads 40 and 41 as illustrated in FIG. 1. A lead 28 and 29 is coupled to and extends from diodes 23 and 24 respectively, being disposed through apertures 50 and 51 in the housing 20. Leads 28 and 29 are coupled to the existing electrical system as hereinafter described.

The one directional diodes 23 and 24 are disposed in the electrical system such that electrical current flow can only proceed from the flasher 22 through lines 26, 17 and 18 and through the diodes 23 and 24. Current is not permitted to flow in the reverse direction because of the directional diodes 23 and 24. In the preferred form, the diodes are silicon rectification diodes. However, other electrical components which limit the directional flow of current may be employed without departing from the spirit or scope of the invention.

The existing electrical system of the automobile has many wire connections, a few of which are illustrated in FIG. 1. For instance, wire 31 couples the existing backup light switch 30 to the backup light 32. The turn signal activator 40 is also in the existing electrical system. Wires 35 and 36 are coupled between the turn signal activator 40 and the right and left tail lights 41 and 42 respectively. In use, the turn signal activator 40 causes either the right or left turn signal to flash so as to give warning to others that the driver is about to turn. The backup switch 30 is activated when the vehicle is placed in reverse.

The present invention is coupled to the existing wiring system as previously described and illustrated in FIG. 1, and described in more detail hereinafter. Lead 25 is coupled at juncture 33 to the existing backup light wire 31. Lead 29 eminating from diode 24 is coupled at juncture 37 to the existing left turn light wire 36. Lead 28 eminating from diode 23 is coupled to the existing right turn wire 35 at juncture 38. In this manner the invented device will cause the existing turn signals of the vehicle to flash simultaneously whenever the car is placed in reverse. This is particularly useful since any recreational vehicle or trailer which is being towed is wired directly into the light system of a towing vehicle. By providing the present invention in the system as described, the rear lights of the vehicle being towed will also flash simultaneously with the turn signal indicators of the towing vehicle.

The one-directional diodes 23 and 24 perform the function of prohibiting energy pulses from one activated turn signal from passing through the juncture 27 thereby causing the alternate turn signal to be activated. Thus, the two diodes permit usage of the turn signals in a normal manner. In addition, the diodes prevent activiation of the backup lights when the turn signal lights are activated. The system will not function if only one of the diodes is used since the turn signal and existing backup lights will be activated at any time either turn signal is activated. The utilization of both diodes prohibits this event from occurring and permits selective flashing of the turn signal indicators in addition to operation of existing backup lights.

This unique safety device is easily adapted to be attached to the electrical system of automobiles, trucks or recreational vehicles.

The housing 20 of the invented device is formed such that it may be fastened directly to the body of an automobile by screw or bolt or it may be disposed within the trunk of the vehicle near the wire loom (not shown). In the preferred form it can be attached to the existing turn signal wires by means of Scotch locks or other known simple coupling devices. In this manner, the invented device can be easily installed by the owner of an automobile without requiring the knowledge and skill of a trained electrician.

The invented device has been described using a standard flasher 22 and silicon rectifying diodes 23 and 24 as the preferred form of the present invention. However, the flasher heretofore described could be any electrical apparatus that will cause any existing steady current to be pulsed at specific intervals. Any of these well known prior art devices can be employed to pulse the signal created when the vehicle is placed in reverse. In addition, any other type of current directional limiting devices can be employed in place of diodes.

However, while the preferred embodiment of the present invention has been described in detail herein, it will be understood by those skilled in the art that various changes in form and detail may be made therein without departing from the spirit and scope of the invention.

I claim:

1. An electrical signal processing system for a vehicle having a back-up lamp and a right and left turn signal lamp, where means is provided in said vehicle for generating constant voltage on a back-up line during backing of said vehicle and an impulsed signal selectively on either a right or left turn signal line during turning of said vehicle, said back-up line coupled to said back-up lamp and said right and left turn signal lines coupled to said right and left turn signal lamps respectively; comprising:
   a. pulsing means electrically coupled to said back-up line;
   b. a first electrical directional limiting means electrically coupled to said pulsing means and to said right turn signal line for permitting current flow only from said pulsing means to said right turn signal line;
   c. a second electrical directional limiting means, electrically coupled to said pulsing means and to said left turn signal line; for permitting energy flow only from said pulsing means to said left turn signal line and for maintaining electrical isolation between said right and left turn signal lines;
   Whereby said right and left turn signal lamps will flash when said vehicle is backing and will otherwise operate normally.

2. The electrical signal processing system of claim 2 wherein said first and second electrical directional limiting means are silicon rectifier diodes.

* * * * *